June 24, 1941.    H. JONES    2,246,943
MOWER SICKLE BAR
Filed May 9, 1940
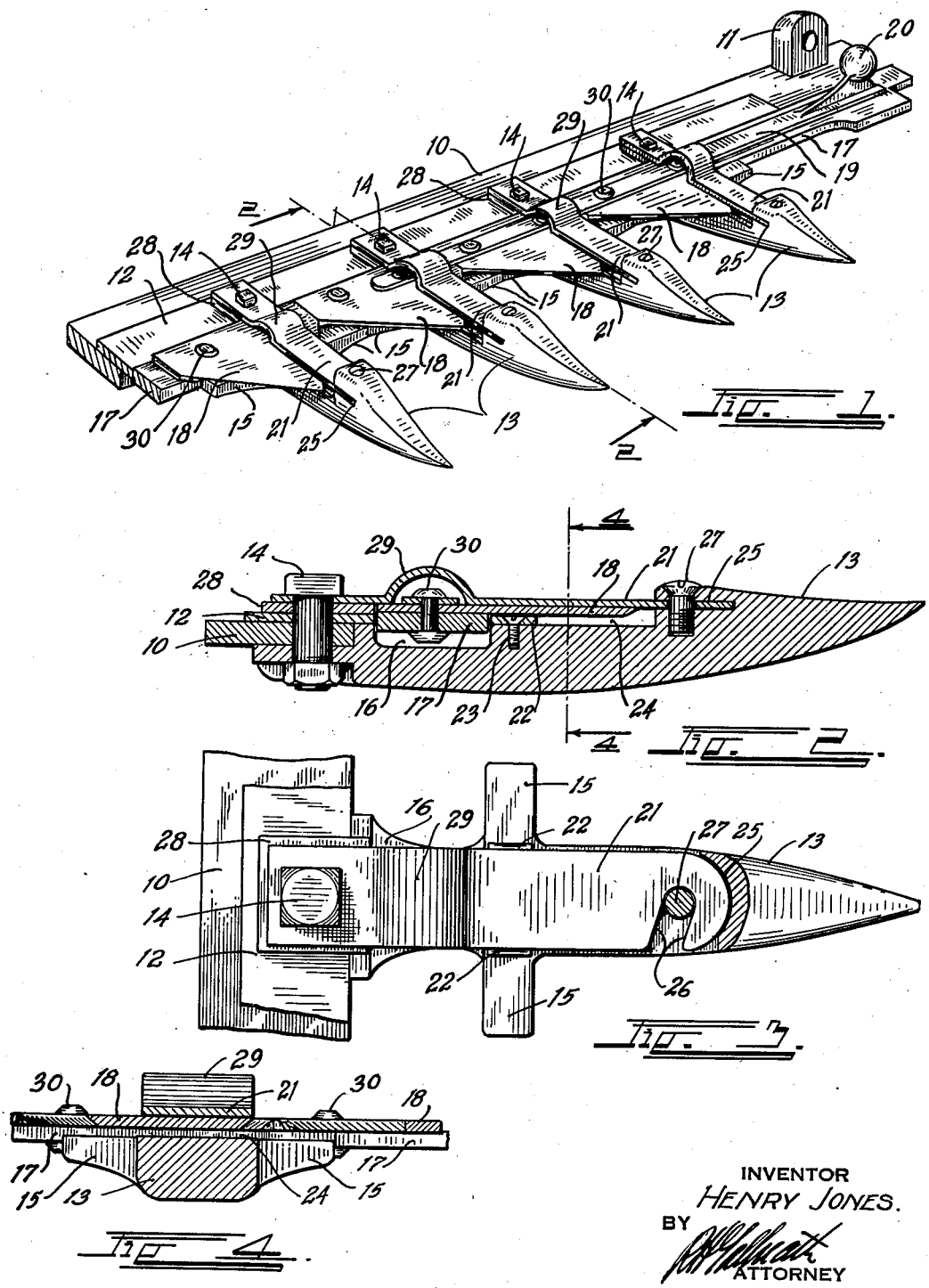
INVENTOR
HENRY JONES.
BY
ATTORNEY Patented June 24, 1941

2,246,943

UNITED STATES PATENT OFFICE 2,246,943

MOWER SICKLE BAR

Henry Jones, Alliance, Nebr.

Application May 9, 1940, Serial No. 334,177

2 Claims. (Cl. 56—298)

This invention relates to an agricultural mower sickle. In the usual sickle, guards are employed to separate the stalks ahead of the cutter bar and to protect the sickle knives. These guards carry ledger plates or stationary cutting members on their upper surfaces. The sickle knives ride on the ledger plates and are supported thereby and act to cut the stalks between the knives and the ledger plates. In such a construction, the edge of the blades is aligned with the lower surface thereof and they are beveled back on their upper surfaces. Such a bevel causes the knife to enter the stalks at a difficult angle for cutting. The principal object of this invention is to provide a construction which will entirely reverse the usual construction, so that the bevel on the knife blade section will be on the bottom surface so that when pushed forwardly against a bending grass blade or plant stalk the sharp edge of the knife will travel across the stalk without interference from the bent lower stem thereof. With a top-beveled knife the flat beveled surface is pushed directly against the bent-over stalk resulting in a pulling or tearing action instead of a clean cut.

Other objects of the invention are: to place the frictional surface between the two cutting members above the vibrating sickle to prevent sand, soil, etc. from accumulating between the two surfaces; to place the ledger plates above the sickle so that they may be quickly removed and replaced without dismantling the cutter bar; and to provide a construction in which, by removal of a single bolt, the entire assembly of guard and ledger plate can be removed from each other and from the machine to facilitate renewals and repairs.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary, perspective view illustrating a mower cutter bar in which the invention is embodied.

Fig. 2 is an enlarged, longitudinal section through one of the guards thereon, taken on the line 2—2, Fig. 1.

Fig. 3 is an enlarged, plan view of one of the guards with the sickle removed, partially broken away to show the method of attachment of the ledger plate.

Fig. 4 is a detail cross section, taken on the line 4—4, Fig. 2.

The usual cutter bar is illustrated at 10 provided with the usual hinge ear 11. To apply this invention thereto a longitudinally extending backing bar 12 is placed along the cutter bar so as to project beyond the forward edge thereof. A series of spaced pointed guards 13 project forwardly from the cutter bar and each is secured thereto by means of a bolt 14 which also serves to hold the backing bar 12 in place. Each guard is provided with the usual spacing arms 15 for holding the guards in their proper parallel spaced positions.

The guards are transversely grooved as indicated at 16 for the passage of a knife bar 17 carrying triangular knife sections 18 secured thereto by means of rivets 30. The knife sections are the usual standard sections but they are secured to the knife bar with their bevelled faces downward instead of upward as in the usual knife. The knife is provided with the usual knife head 19 and ball 20 for connection to the operating pitman of the mower.

Each knife section reciprocates below an elongated cutter or ledger plate 21 and the cutters are held against the ledger plates by means of wear blocks 22 secured to the guards 13 by means of countersunk screws 23. The guards are cut away below the knife sections to provide a clearance space 24 to prevent sand and soil from packing and weaving between the guard and the knife section.

The forward extremities of the ledger plates are rounded and fit snugly into rounded receiving slots 25 in the guards. The rounded extremities are slotted as shown at 26 to receive a stud screw 27 in the guard. The ledger plates are put in place by turning them to a position at right angles to the guards and engaging the slots 26 on the studs 27. The plates are then rotated into alignment with the guards about the studs 27 as a pivot. As they are rotated into position the rounded ends on the ledger plates rotate into the rounded slots in the guards to the position of Fig. 3. The stud 27 prevents the ledger plate from moving to one side and the rounded slot in the guard prevents it from moving in the other direction.

After the ledger plate is in alignment, the free extremity is clamped into place by one of the bolts 14. A spacing member 28 is positioned beneath the bolted extremity of each ledger plate to bring the ledger plate into horizontal alignment with the plane of the knife sections. All of the ledger plates are arched as shown at 29 for the passage of the heads of the knife section rivets 30. The ledger plates over the knife head 19 may be provided with larger arches for the passage of the knife head member 19.

The above inverted construction has been uniformly successful in cutting heavy, wirey marsh grasses in which the usual mower sickle was powerless. The success is due to several reasons: First, the forward motion of the mower pushes the sharp edges of the knife sections into the grass stalks as the stalks begin to bend, the sharp edges travel across the stalks at an incline and sever them with a minimum of effort. In the usual top-bevelled knife the sharp edge enters the bending stalks at right angles and the forward motion of the mower scrapes and drags the knife along the stalk with a tearing action. Second, the moving knives are below the ledger plates. Sand, soil, stubble, and stalk particles cannot lie on the ledger plates to create friction since the friction faces of the plates are on the bottom. These foreign materials cannot collect in the top of the knives for these are rapidly reciprocating. Therefore friction is reduced to a minimum.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A mower sickle comprising: a knife bar; a series of triangular knife sections secured along said bar with their apexes projecting forward along one side thereof, the projecting edges being bevelled upwardly and forwardly from the bottom faces; a stationary cutting member for each knife section; a cutter bar; spaced guards along said cutter bar; a ledger plate in each guard; means for supporting the ledger plates in said guards above said knife sections; an upwardly projecting portion on each guard ahead of said knife sections and having a horizontal slot positioned above said knife section, said slot being rounded to form a semi-circular socket; a vertical stud member at the axis of said socket, the extremities of said ledger plates being rounded to fit the contour of said sockets and being provided with a notch for engaging said stud; and means for securing the rearward extremities of said ledger plates to said cutter bar.

2. A mower sickle comprising: a knife bar; a series of triangular knife sections secured along said bar; a cutter bar; spaced guards along said cutter bar, each guard extending along one face of a knife section; a portion on each guard projecting over the front of each knife section and having a horizontal slot positioned in alignment with the distant fall of the knife section with reference to its guard, said slot being rounded to form a semi-circular socket; a vertical stud member at the axis of said socket; a ledger plate in each guard one extremity of each ledger plate conformed to fit into one of said sockets and being provided with a notch for receiving said stud; and means for securing the other extremity of each ledger plate to prevent rotation thereof about said stud.

HENRY JONES.